United States Patent [19]

Mirabile

[11] Patent Number: 5,400,597
[45] Date of Patent: Mar. 28, 1995

[54] TURBOCHARGER SYSTEM WITH ELECTRIC BLOWER

[76] Inventor: Nicholas F. Mirabile, Apt. No. 1401 750 E. Mid-Cities Blvd., Euless, Tex. 76039

[21] Appl. No.: 80,419

[22] Filed: Jun. 18, 1993

[51] Int. Cl.⁶ .............................................. F02B 33/44
[52] U.S. Cl. ........................................ 60/606; 60/602; 60/607
[58] Field of Search ...................... 60/606, 602, 605.1, 60/614, 607, 608; 123/565

[56] References Cited

U.S. PATENT DOCUMENTS

| | | | |
|---|---|---|---|
| 4,018,053 | 4/1977 | Rudert et al. | 60/606 |
| 4,062,188 | 12/1977 | Cutler et al. | |
| 4,091,620 | 5/1978 | Dorsch | 60/606 |
| 4,296,605 | 10/1981 | Price | |
| 4,322,949 | 4/1982 | Bryne et al. | 60/606 |
| 4,481,773 | 11/1984 | Sugito et al. | 60/606 |
| 4,891,946 | 1/1990 | Inoue | 60/602 |
| 4,996,839 | 3/1991 | Wilkinson et al. | |
| 5,028,241 | 7/1991 | Kooiman et al. | |
| 5,165,234 | 11/1992 | Kakuta | 60/605.1 |
| 5,179,838 | 1/1993 | Kakuta | 60/614 |

OTHER PUBLICATIONS

MacInnes, *Turbochargers*, HPBooks, 1984.
Baker, "Gale Banks Turbocharging; Pressure Perfect," Petersen Publishing Co., 1982.
"600 Horsepower You Can Live With," *Car and Driver*, date unknown.
Goyer, "All About Turbochargers, Or how to get way up there fast," *Air Progress*, Jun., 1992, pp. 48, 49, and 76.

*Primary Examiner*—Richard A. Bertsch
*Assistant Examiner*—Charles G. Freay
*Attorney, Agent, or Firm*—Keith Hargrove

[57] ABSTRACT

A novel turbocharger is disclosed that includes a compressor wheel and two turbine wheels all mounted on a common drive shaft. Also included is an auxiliary airflow generator to turn one or both turbine wheels. In normal operation, engine exhaust is used to drive the compressor wheel. The improved turbocharger uses two turbine wheels to drive one compressor wheel on one common drive shaft, which invention is intended to eliminate the turbo lag problem inherent in a single turbine turbocharger. In one embodiment, the auxiliary airflow generator spins the turbine wheel at low engine speeds to overcome the problem of turbo lag. In one embodiment, the airflow generator is a blower fan, which directs air through the turbine. In another embodiment, the airflow generator is a vacuum generator, which impels air through the turbine wheel. The two embodiments may be combined such that the blower and the vacuum generator compliment each other in operation. A microprocessor, with sensors, may be added to monitor the engine and turbocharger conditions to optimize engine speed. A single turbine wheel may be used with the airflow generator and the engine exhaust to drive the compressor wheel. The first and second turbine wheels may be coupled in serial fashion so as to allow the engine exhaust to drive the first turbine wheel and then the second turbine wheel.

9 Claims, 4 Drawing Sheets

TURBOCHARGER SYSTEM WITH ELECTRIC BLOWER

BACKGROUND OF THE INVENTION

This invention relates generally to performance enhancing systems for internal combustion engines used in automobiles. More specifically, this invention relates to a turbocharger that uses a novel turbine drive source for driving the compressor at a power-enhancement or boost level regardless of the engine exhaust output level.

Many techniques have been devised to increase the performance of automotive internal combustion engines. Supercharger and turbocharger systems have been developed that substantially boost engine performance. These systems operate to increase air pressure delivered to the intake manifold of the engine before being mixed with the fuel. The increased air pressure enhances the combustibility of the fuel, thus making it more powerful. This added power then increases engine power and torque at both lower and higher rpms than would otherwise be possible.

Superchargers and turbochargers typically derive their operating power from the engine. For example, the supercharger, which is an active performance boosting device, uses the engine to turn complicated belts and pulleys, thereby turning successive compressor stages to compress the intake air before introduction into the engine. This allows the supercharger to deliver nearly instantaneous improved engine performance. The belts and pulleys require for operation as much as 40% of the engine's power output, which exacts a price of shortening the engine's life span for the increased performance.

Turbochargers, on the other hand, are passive performance boosting devices that are driven by the exhaust from the engine. The passive design of the turbocharger does not adversely affect the life span of the engine to the degree that a supercharger does. A typical turbocharger has a turbine wheel and a compressor mounted on the same shaft. Fan blades are attached to the turbine wheel, which is placed in the path of the exhaust gases from the engine. The exhaust gases drive the turbine wheel, which then turns the drive shaft. As the drive shaft turns, the compressor fan acts to impel ambient air into a compressor channel, thereby compressing the air. Since the turbocharger is powered by the engine exhaust gases, little to no power boost is available at idle or low speeds since the engine does not generate sufficient enough exhaust force to turn the turbine to compress the air. This condition is known as turbo lag, which means that no extra performance boost is available until the engine is operating at an rpm level high enough to drive the turbocharger fast enough to compress the air for enhancing performance.

Several solutions have been developed to overcome the problem of turbo lag. One solution combines a supercharger with a turbocharger. The supercharger drives the turbocharger until the engine has reached a threshold level at which point it takes over the supercharger's job. This has the advantage of limiting the use of the supercharger, but it also has the drawback of being an active system that shortens engine life, as well as being overly complex.

Another solution is to add a motor to turn the turbocharger shaft until the engine exhaust can take over. The problem with this design is that the motor must drive the shaft at a level exceeding 100,000 rpms. Such motors demand a high electrical load and are very expensive. Also, they are prone to failure due to the high demands placed on them.

Accordingly, what is needed is a turbocharger system that eliminates turbo lag inherent in turbocharger systems. This should be done without resorting to direct drive systems that are prone to failure. Nor should additional compressor stages be required to eliminate turbo lag.

SUMMARY OF THE INVENTION

According to the present invention an internal combustion engine system, generally having exhaust and intake manifolds and a fuel regulator, uses an improved turbocharger. The turbocharger includes a drive shaft, a compressor wheel coaxially mounted on the drive shaft, a turbine wheel coaxially mounted on the drive shaft, and an auxiliary turbine fan for providing an alternative or secondary source of air flow for turning the turbine wheel regardless of the force of the exhaust gases from the exhaust manifold. This system allows the turbocharger to deliver pressure boost to the engine nearly instantaneously, thereby eliminating turbo lag, which occurs in prior systems driven by just the exhaust gases when the engine is at idle or turning low rpms. This boost pressure is available at idle, thus enabling the engine to deliver much higher horsepower with even a slight throttle movement or increase than otherwise possible. After this power is achieved, engine exhaust is used to attain the remaining boost and the secondary turbine fan kicks out.

The secondary source of air flow may be provided by either a blower fan, which provides approximately the same amount of air with approximately the same energy level as the exhaust from the engine during higher or optimal operating conditions, or a vacuum motor, which draws air through the turbine wheel at a rate near that provided by the engine exhaust. Further, a baffle is provided when the blower is placed along side the exhaust port fed to the turbine wheel so as to control back pressure introduced by the addition of the blower. Also, a waste gate is added to the exhaust to relieve the back pressure caused by either the addition of the turbocharger or the blower. The vacuum motor tends to reduce back pressure as it draws the exhaust away from the turbocharger and the exhaust manifold.

The turbocharger also includes a plurality of sensors located at the exhaust and intake manifolds, at the turbine wheel, and at the fuel regulator for monitoring the conditions of operation where the sensors are located. The sensors are used to provide information to a microprocessor designed to optimize air to fuel mixture, boost pressure generated by the turbocharger, and turbocharger drive generated by the exhaust or the blower.

The turbocharger may include an intercooler for cooling the compressed air from the compressor before introduction into said intake manifold. Also, a venturi flow restrictor is added to improve flow force and is coupled between the vacuum generator and the turbine wheel.

In another embodiment of the improved turbocharger system, the turbocharger includes a drive shaft, a compressor coaxially mounted on a first end of the shaft, first and second turbine wheels, and secondary air flow generator. The flow generator drives the second turbine wheel, which compresses the ambient air by turning the compressor. The engine exhaust drives the first turbine wheel once the exhaust reaches a sufficient level.

Yet another improved turbocharger includes a drive shaft, a first and second turbine wheel, both coaxially mounted to the drive shaft, and a compressor, coaxially mounted to a second end of the drive shaft for compressing the air before reaching the engine. The engine exhaust, through the exhaust manifold, turns the first turbine wheel and drive shaft. The second turbine wheel is coupled to the exhaust manifold downstream the first turbine wheel so the exhaust passing the first turbine wheel turns the second turbine wheel and drive shaft, thereby improving the turbocharger's efficiency.

DETAILED DESCRIPTION OF THE SPECIFIC EMBODIMENTS

Figure 1:
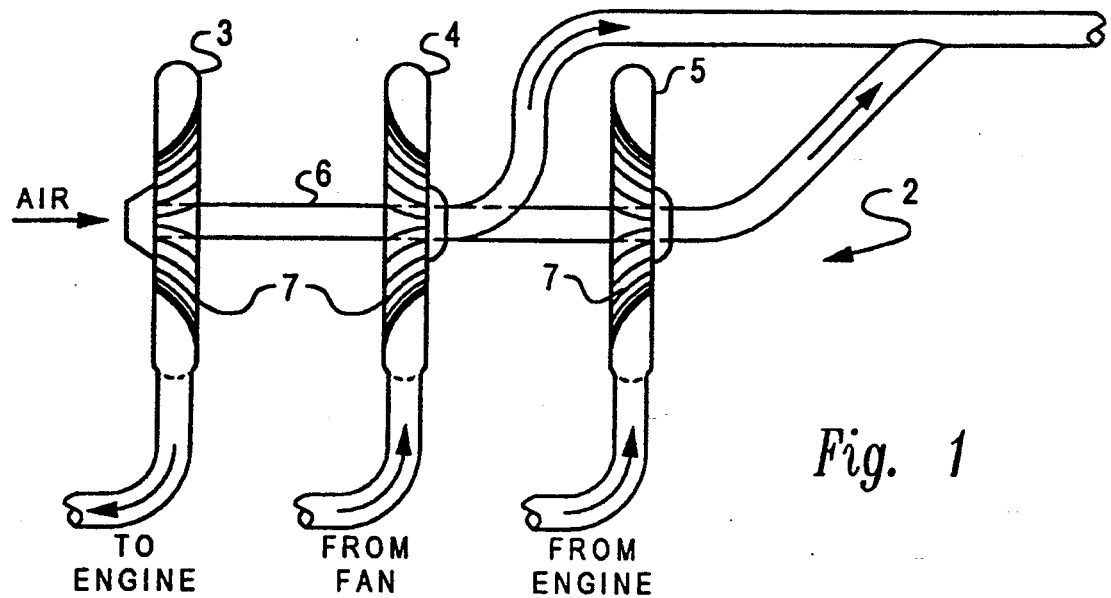
FIG. 1 illustrates a cross sectional view of a turbocharger system having first and second turbine wheels.

A cross sectional illustration of a turbocharger 2 is shown in FIG. 1. Turbocharger 2 includes a compressor wheel 3 and a pair of turbine wheels 4 and 5 commonly mounted on a drive shaft 6. Turbocharger 2 is mounted to an engine (not shown) to provide additional pressure boost, thus resulting in greatly increased horsepower, at all operating engine speeds. This is accomplished at low engine rpms by use of a blower fan (not shown) that drives turbine wheel 4. Turbine wheel 5 is driven by the engine exhaust. After the additional power is achieved, the engine exhaust used to drive turbine wheel 5 provides additional boost until such a time that the blower fan can be kicked out or turned off.

Each turbine wheel 4 and 5 and compressor wheel 6 have vanes 7, which catch the exhaust or air. Vanes 7 on compressor wheel 3 may be variable pitch vanes to optimize boost performance. Additional, more detailed embodiments are described below.

Figure 2:
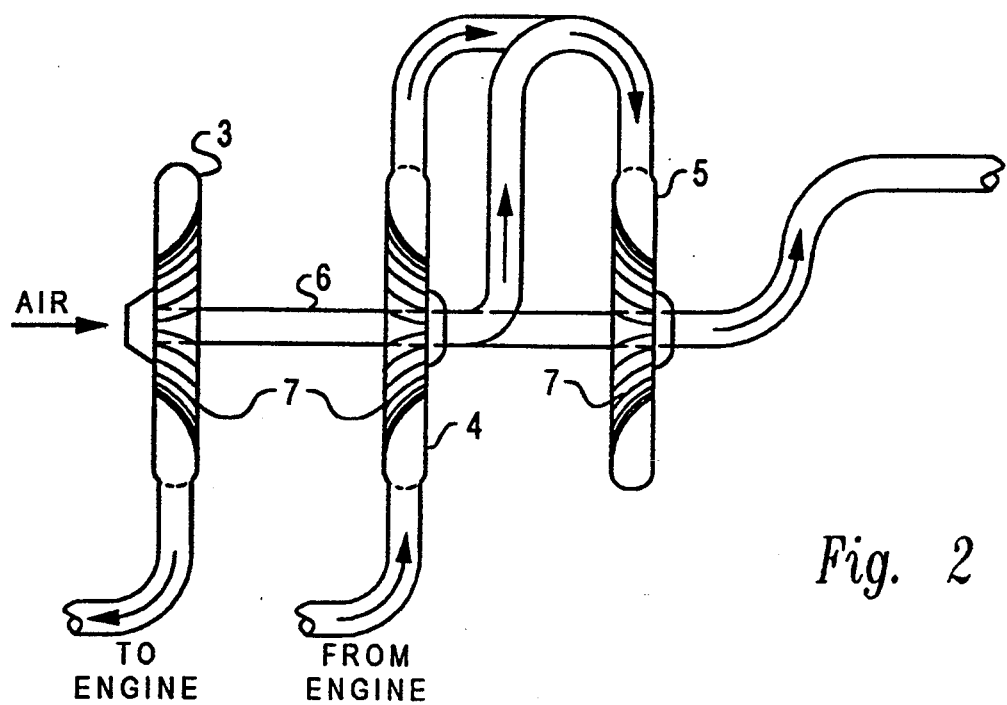
FIG. 2 illustrates a cross sectional view of a turbocharger system using a pair of turbine wheels mounted in tandem to the engine exhaust.

A second arrangement of the twin turbine design is shown in the cross sectional view of FIG. 2. Turbocharger 2 has been modified so that both turbine wheels 4 and 5 are tandemly driven by the engine exhaust. The second turbine wheel 5 is located down stream from the first turbine wheel 4 so that, after the exhaust turns turbine wheel 4, the remaining force from the exhaust then turns turbine wheel 5. This increases the responsiveness of turbocharger 2 since it makes greater use of the exhaust force. Compressor wheel 3 also has vanes 7, which may or may not be variable pitch. A more detailed description of the tandemly mounted turbine wheel design is given below.

Figure 3:
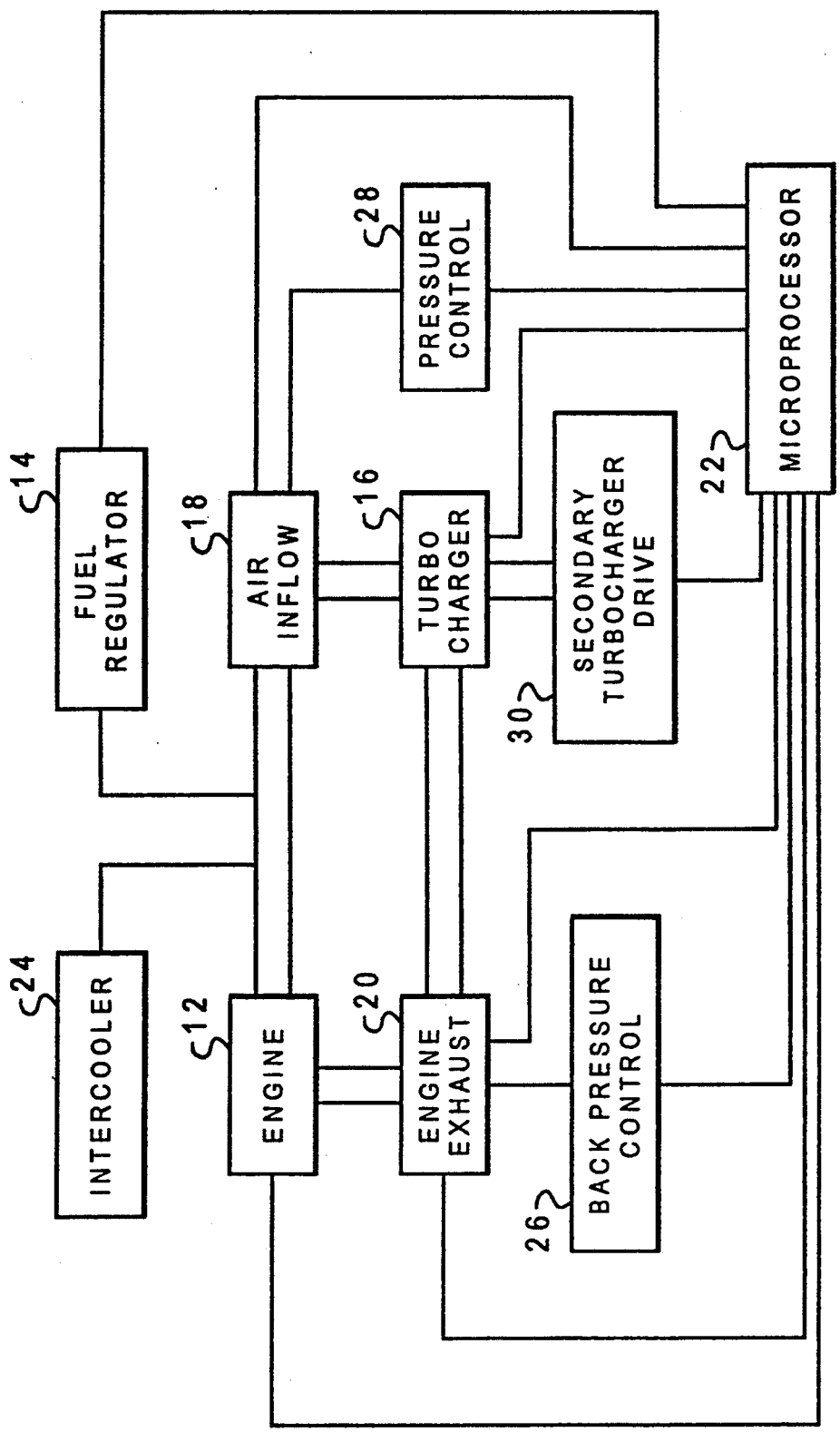
FIG. 3 is a block diagram illustrating the turbocharger system including a second turbine wheel and microprocessor control.

A more detailed system of engine system 10 illustrated in FIG. 1 is shown in the block diagram of FIG. 3. The engine system 10 generally includes an engine 12, a fuel regulator 14, and a turbocharger 16. Engine 12 is coupled to an air inflow or intake manifold 18 and an engine exhaust manifold 20. A microprocessor 22 includes sensors connected to each of the engine system components for measuring performance, air flow, engine output, fuel mixture, and several other factors to optimize the performance of engine 12.

The fuel regulator 14 and intake manifold 18 are connected together so they can deliver a proper ratio of fuel and air to engine 12 to maximize efficiency, power, or performance. Turbocharger 16 is connected to intake manifold 18 to compress the air before being mixed with the fuel to increase both engine efficiency and power. Turbocharger 16 is drivenly connected to exhaust manifold 20 so the exhaust from engine 12 drives a turbine wheel within the turbocharger to provide air compression.

As the air is compressed, its temperature increases, which reduces the performance gained by compressing the air. This increased temperature also increases NOx emissions, which are pollutant. Thus, an intercooler 24 is coupled to air inflow controller 18 so as to cool the air before it reaches engine 12 for combustion. Intercooler 24 causes the air to become more dense as it is cooled, thus aiding in greater combustion power and efficiency and eliminating excess NOx waste products.

Turbocharger 16, as connected to engine exhaust manifold 20, reduces the ability of engine 12 to aspirate properly since it restricts engine exhaust. A back pressure control port 26 couples to exhaust manifold 20 and opens on occasions when microprocessor 22 senses that turbocharger 16 restricts proper exhausting of engine 12. Turbocharger 16 can, as connected to air intake regulator 18 and under the right circumstances, deliver too much pressure that can damage or destroy the engine. A pressure boost control regulator 28, or waste gate, couples to air intake regulator 18 and opens to relieve any over pressure sensed by microprocessor 22, thus protecting the engine. Additionally, the waste gate can use a spring loaded gate, instead of microprocessor control, that opens once the spring force is reached.

Engine 12 uses its exhaust to drive turbocharger 16. At low exhaust pressure, which is directly proportional to engine rpm's (revolutions per minute), turbocharger 16 delivers negligible intake boost. Not until engine 12 reaches a sufficient rpm level does turbocharger 16 begin to deliver beneficial boost. This delay occurring between the low rpm level and a higher boost level is know as the turbo lag effect. Accordingly, a secondary turbocharger drive means 30 is coupled to turbocharger 16 to drive the turbocharger during times when the engine exhaust is inadequate to drive the turbocharger, thus eliminating turbo lag. Microprocessor 22 also connects to secondary turbocharger drive means 30 to control the operation of the drive means for optimal engine performance and efficiency. In one embodiment, drive means 30 also increases engine exhausting efficiency to compensate for the increased back pressure caused by turbocharger 16.

Figure 4:
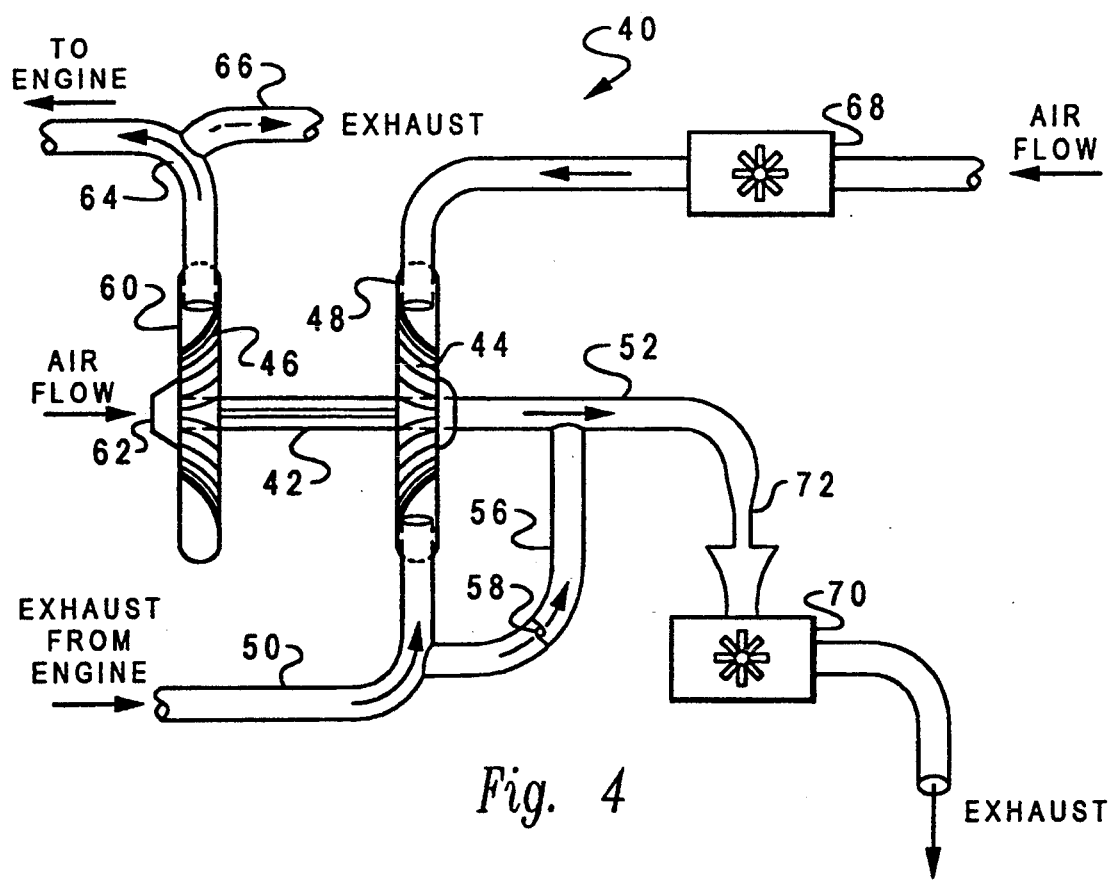
FIG. 4 illustrates a first embodiment of the turbocharger system of FIG. 1 wherein the second turbine wheel is coupled to a first turbine wheel.

A more detailed embodiment of the novel turbocharger system is illustrated in FIG. 4. A turbocharger 40 is shown that uses a single turbine wheel design. A drive shaft 42 coaxially connects a turbine wheel 44 to a compressor wheel 46. Turbine wheel 44 is protected by cover 48 and connects to an exhaust port 50 from the engine exhaust manifold. Turbine wheel 44 further connects to an outer port 52 to allow the exhaust gases to exit from turbine shell 48, which exhaust gases are eventually exhausted to the atmosphere. Since turbocharger 40 restricts the exhaust from the engine, a waste port 56 connects exhaust port 50 to outer port 52. A waste gate 58 opens or closes to allow the exhaust gas to bypass or drive turbine wheel 44.

Compressor wheel 46 is shielded by a cover 60 and connects to an external air flow source 62 and to an engine intake manifold port 64. To prevent too high an intake air pressure from being delivered to the engine, a second waste gate 66 connects to shell 60 and a valve (not shown) within waste gate 66 relieves the over pressure by opening when necessary.

Turbine cover 48 couples to an high volume blower 68, which pulls in outside air during operation. Blower 68 operates to direct the air through the vanes of turbine wheel 44 at speeds high enough to drive compressor fan 46 at a level comparable to when the engine exhaust can drive the turbocharger and deliver extra boost. FIG. 4 shows that the input from blower 68 is coupled on the opposite side of cover 48 to which exhaust port 50 is coupled. In another embodiment, blower 68 may share the same input to turbine cover 48 as used by exhaust port 50. A baffle is then used between the two drive sources to prevent exhaust back pressure from interfering with normal engine aspiration. The exhaust from blower 68 passes out exhaust port 52.

The exhaust port 52 can be further connected to a vacuum motor 70. A venturi flow restrictor 72 is part of exhaust port 52. During operation, vacuum motor 70, which is powered by the engine's electrical system, impels exhaust through turbine wheel 44 from either exhaust port 50 or the input port of blower 68. The venturi flow restrictor 72 increases the vacuum effect so the vacuum differential at port 52 draws air or exhaust through turbine housing 48 at such a rate as to power turbine wheel 44 to drive compressor wheel 46.

Since vacuum motor 70 is drawing air and exhaust out of the engine system, the engine exhausting capabilities are greatly improved, nearly eliminating any back pressure normally associated in conventional turbocharger systems. Moreover, the turbocharger system, according to the present invention, may use either electric blower 68 or electric vacuum motor 70, or both, as determined by the user. In addition, the microprocessor is programmed so as to optimize the performance of either blower 68 or vacuum motor 70, or both, during engine operation, and to phase out their operation once the engine exhaust can sustain adequate turbine speeds.

Figure 5:
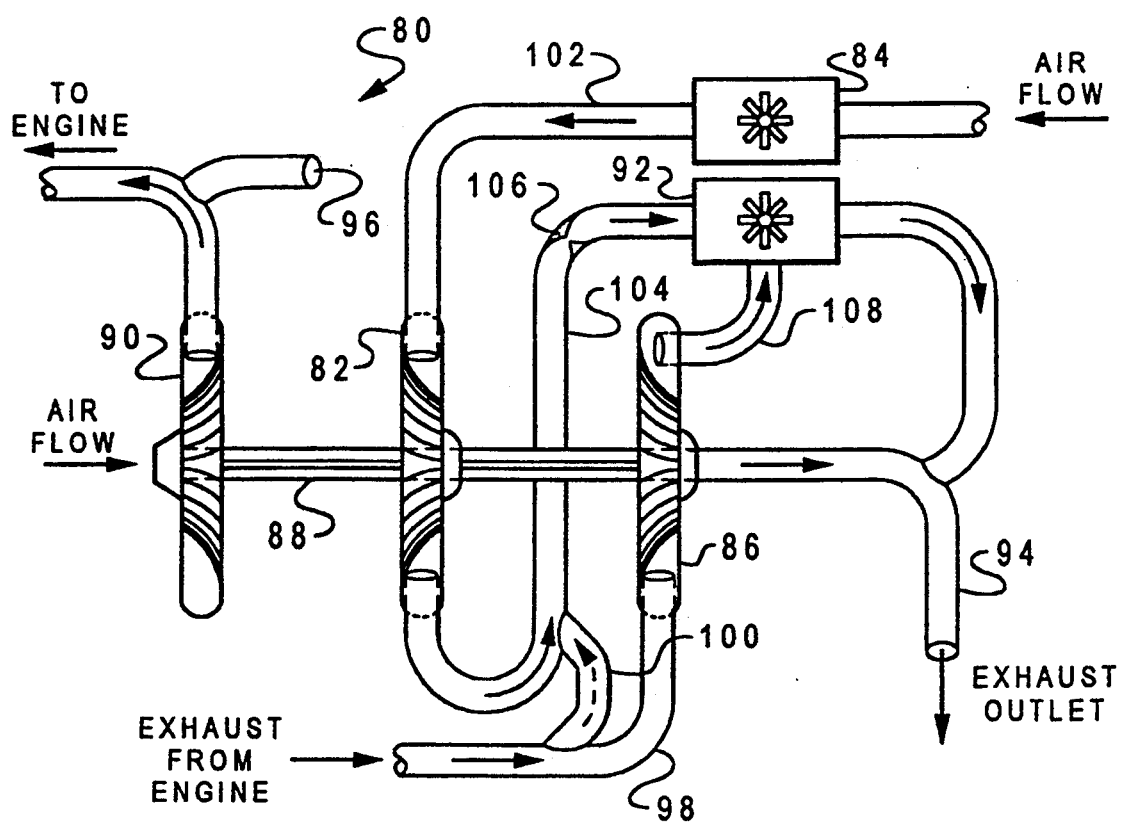
FIG. 5 illustrates a second embodiment of the turbocharger system of FIG. 1 further including a second turbine wheel, which is part of the secondary turbocharger drive unit; and, FIG. 6 illustrates an alternative embodiment of the the turbocharger system of FIG. 2.

FIG. 5 illustrates a second embodiment of a turbocharger 80 according to the present invention. In this embodiment, a second turbine wheel and housing 82 is provided to isolate a blower 84 from a first or exhaust turbine wheel and housing 86 driven by the exhaust gases from the engine. A drive shaft 88 coaxially connects both turbines 82 and 86 to a compressor wheel and housing 90. A vacuum motor 92 connects both turbines 82 and 86 to the same turbine exhaust port 94.

Compressor 90 connects to the engine intake manifold and to a turbocharger intercooler used to remove the heat added to the compressed air turning the compression operation. A waste gate 96 is used to protect the engine from being damage by an unsafe pressure level developed by turbocharger 80.

An engine exhaust port 98 connects the engine to first turbine 86 and to a back pressure relief port 100. Blower port 102 connects blower 84 to second turbine 82. A second exhaust port 104 connects second turbine 82 to vacuum motor 92 and includes a venturi flow restrictor 106 to increase the vacuum pressure differential during operation. Back pressure port 108 further connects exhaust port 98 to second exhaust port 104 for relieving back pressure caused by first turbine 86. Vacuum motor 92 also serves to reduce back pressure by drawing exhaust through exhaust port 104 or through a vacuum exhaust port 108, which connects first turbine 86 to the vacuum motor. Vacuum motor 92 then exhausts waste gases through exhaust port 94.

Figure 6:
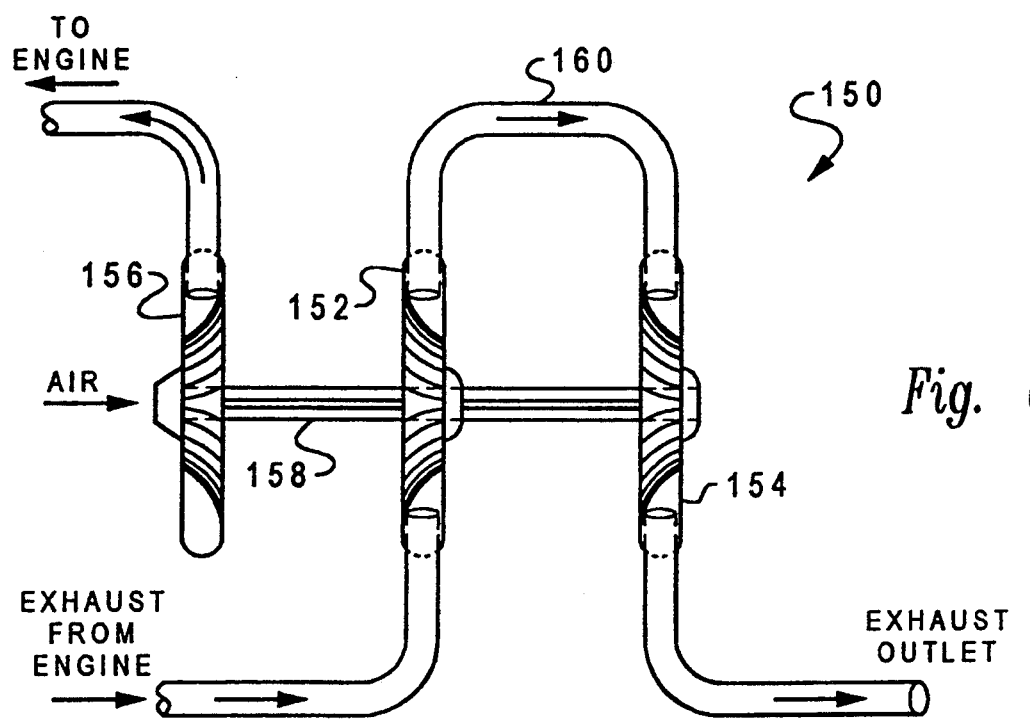

An alternative embodiment to reduce turbo lag is illustrated in FIG. 6. A turbocharger 150 is shown that includes a pair of turbine wheels 152 and 154 and a compressor fan 156 all coaxially mounted on a common drive shaft 158. Exhaust from the engine is used to power both turbine wheels 152 and 154, which are coupled together with turbo exhaust port 160. As the exhaust passes through the vanes of turbine wheel 152, thereby turning the wheel, compressor wheel 156 compresses the air for combustion with the fuel in the engine. Afterwards, the exhaust passes through turbine wheel 154, which also turns compressor wheel 156 and extracts the energy from the exhaust not used when the exhaust passed through the first turbine wheel.

The size of both turbine wheels may be the same for ease of manufacture and assembly. It is realized that the second turbine wheel must be optimized so the exhaust can turn it fast enough to contribute to the turbocharging of the engine. This may be accomplished by either reducing the weight, or moment of inertia, of the second turbine wheel, or by increasing the efficiency of the vanes at gathering exhaust and converting the exhaust energy to compression power. Another method may be to add a flow restrictor, such as a venturi restrictor or a nozzle, between the two turbine wheels for concentrating the exhaust across a smaller, yet more responsive, turbine wheel.

A turbocharger system for reducing turbo lag by injecting air through the turbine wheel before the exhaust energy of the engine is sufficient to power the turbocharger has been shown and described. Various embodiments have been disclosed by way of example and not for purposes of limitation. Other embodiments and changes will be evident to those skilled in the art, such as, for example, the fuel regulator may be either a carburetor or a fuel injector, or the ambient air used to drive a turbine wheel may be used to cool the intercooler, rather than exhaust with the engine exhaust. Further, either the compressor fan and turbine wheel may be mounted back to back, having a common border, or two turbine wheels may be so mounted having a common border. Accordingly, it is intended that the scope of claims define the present invention and not merely the specific embodiments herein described.

What is claimed is:

1. In an internal combustion engine system comprising exhaust and intake manifolds and a fuel regulator, an improved turbocharger comprising:

a shaft having a center axis and rotatable about the center axis;

a compressor fan coaxially mounted on a first end of said shaft for compressing ambient air for delivery to an intake manifold of said engine;

a turbine wheel having a plurality of vanes and being coaxially mounted on said shaft, said turbine wheel coupled to an exhaust manifold of said engine such that the engine exhaust passes through the plurality of vanes thereby turning said turbine wheel, which then turns said compressor fan via connection to said shaft, whereby the turning action of said turbine wheel drives the compressor fan to compress the ambient air;

an electric blower, that directs air through said plurality of vanes of said turbine wheel, for providing a force for turning said turbine wheel.

2. The turbocharger of claim 1 wherein said engine further comprises a plurality of sensors located at said exhaust and intake manifolds, at said turbine wheel, and at said fuel regulator for monitoring the conditions of operation where the plurality of sensors are located for optimizing the performance of the turbocharger.

3. The turbocharger of claim 2 further comprising a microprocessor, coupled to said plurality of sensors, and programmed to optimize the pressure generated by the turbocharger by controlling the operation of said electric blower based on information monitored by said plurality of sensors.

4. The turbocharger of claim 1 further comprising a waste gate coupled to said compressor fan for preventing overpressurizing said intake manifold.

5. The turbocharger of claim 1 wherein said vanes are adjustable for increasing the efficiency of said turbine wheel.

6. The turbocharger of claim 1 further comprising an intercooler, coupled to said compressor, for cooling the compressed air before introduction into said intake manifold.

7. The turbocharger of claim 1 further comprises a vacuum generator for drawing a gas flow through said plurality of vanes of said turbine wheel.

8. The turbocharger of claim 7 further comprising a venturi flow restrictor, coupled between said vacuum generator and said turbine wheel.

9. The turbocharger of claim 1 wherein said electric blower provides approximately the same amount of force as the engine exhaust at increased engine rpms.

* * * * *